Dec. 13, 1938. H. ESPENSCHIED 2,140,222
PIGMENTARY LEAD TITANATE AND METHOD FOR MAKING THE SAME
Filed Feb. 23, 1937 2 Sheets-Sheet 2
FIG. 3.
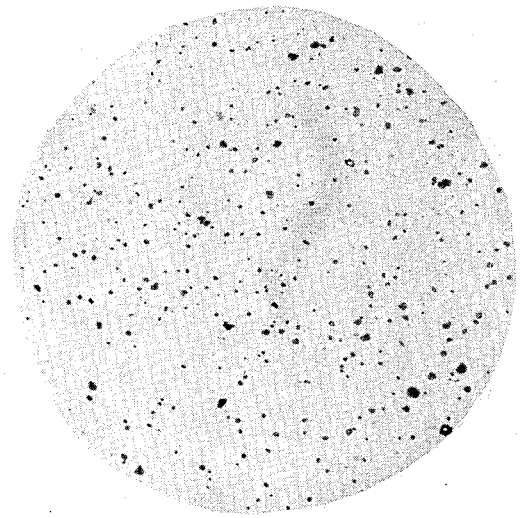
PIGMENT No. 2.
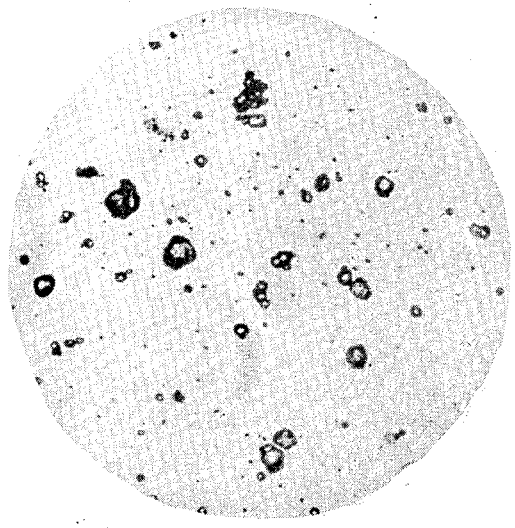
PIGMENT No. 2A.
MICRONS
0   8   16
HELMUT ESPENSCHIED
INVENTOR
BY Charles F. Kaegebehn
ATTORNEYS.

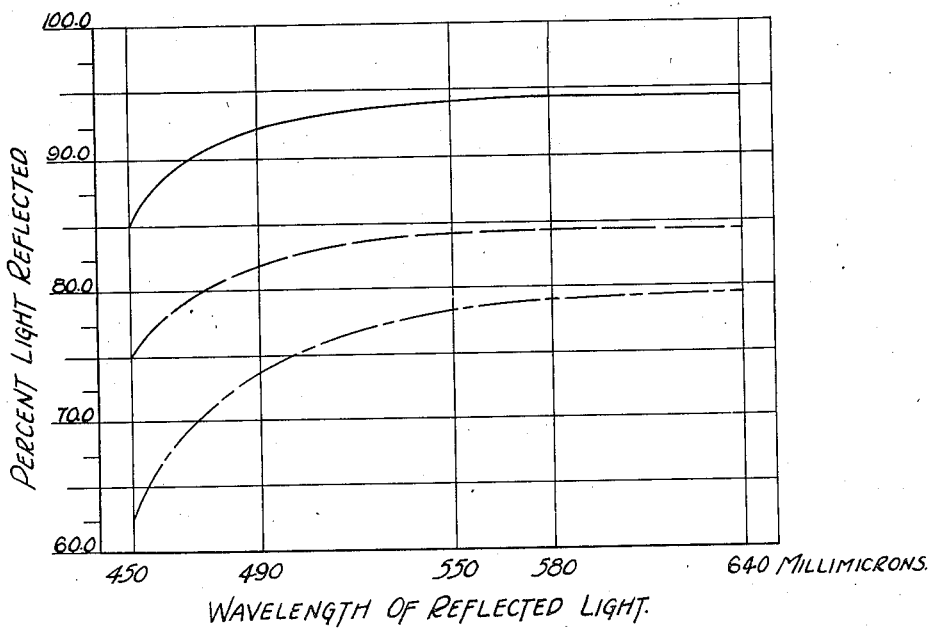

Patented Dec. 13, 1938

2,140,222

UNITED STATES PATENT OFFICE 2,140,222

PIGMENTARY LEAD TITANATE AND METHOD FOR MAKING THE SAME

Helmut Espenschied, Metuchen Township, Middlesex County, N. J., assignor to National Lead Company, New York, N. Y., a corporation of New Jersey Application February 23, 1937, Serial No. 127,302

15 Claims. (Cl. 134—67)

This invention relates to pigmentary lead titanate and to methods for its manufacture.

An object of the present invention is a method for the production of pigments consisting of essentially or comprising lead titanate. Another object of the invention is a method for controlling the uniformity and particle size of pigmentary lead titanate. A third object of the invention is a method for overcoming the photosensitivity and increasing the brightness of pigmentary lead titanate. These and other objects of the invention, including the products of the methods herein set forth, will become apparent from the following description thereof:

Methods for the preparation of the compound, $PbTiO_3$, have been described but these prior art procedures because of certain inherent difficulties without exception have failed to yield a product suitable for use as a pigment. If, for instance, a starting mixture of oxides of lead and titanium or oxide-forming compounds thereof were heated to a sufficiently high temperature to bring about substantially complete titanate formation the product became excessively coarse and hard, lacked uniformity of particle size, was discolored and photosensitive and had a low brightness value. If, on the other hand, in order to avoid these disadvantages, the starting mixture was heated at a lower temperature the formation of the titanate did not go to completion, and the product did not develop the proper degree of crystallinity or particle size. In many instances an undesirable excess of lead compounds was present in the final product. When incorporated in a surface-coating vehicle, films prepared therefrom tended to chalk and generally lacked resistance to weathering influences. The prior art failed to find an optimum temperature at which pigmentary lead titanate could be prepared free of the disadvantages of an excessively low or an excessively high calcination temperature. Apparently, according to my researches no such optimum temperature exists and, consequently, the prior art investigators failed to escape from the dilemma which confronted them.

By means of my invention pigments consisting essentially of or comprising lead titanate can be prepared which possess uniform particle size, high tinning strength, high brightness, good color, chemical and physical inertness, freedom from photosensitivity and other requisite pigment characteristics.

The complete process of my invention may be broadly described as comprising the calcination of an intimate and uniform mixture of a reactive titanium compound and a reactive lead compound containing an adjusted amount of sulphuric acid or its equivalent under carefully controlled reaction temperatures whereby titanate formation is substantially complete at a relatively low temperature, and development of particle size and crystallinity is brought about at a relatively high temperature. Thus my invention may be considered as comprising the three following features:

(1) The preparation of the intimate mixture of reactive titanium compound and reactive lead compound; (2) the adjustment of the content of sulphuric acid or its equivalent in the said mixture of reactive titanium compound and reactive lead compound; and (3) the control of the calcination temperatures. When all three features are combined in a process for the preparation of lead titanate the resultant product will be of superior pigment quality, but it will be understood that each of these three features may be used in conjunction with a prior art method with a resulting improvement in the product obtained thereby.

I. *The preparation of the intimate mixture of starting ingredients*

It is essential that the mixture of reactive titanium compound and reactive lead compound be extremely intimate and uniform and that the components thereof be finely divided. To obtain this intimate and uniform mixture any suitable means may be employed. I prefer, however, that the mixing should be carried out in the wet state. For example, the reactive titanium compound and the reactive lead compound may be wet-milled together until a sufficient degree of fineness and uniformity of the components is obtained. Another very convenient method for obtaining such an intimate and uniform mixture of these starting ingredients is to precipitate one or both ingredients from aqueous solution in the presence of the other. For instance, finely-divided reactive titanium compound may be suspended in a solution of a water soluble lead salt and coprecipitated with the reactive lead compound by adding a precipitating agent, for example, an alkali neutralizing agent to the suspension. Furthermore, it is possible to conduct the wet-milling of the starting ingredients in the presence of the well-known dispersing agents for titanium compounds and lead compounds, or to disperse separately the lead compound and the titanium compound in aqueous mediums with or without the aid of dispersing agents, mix these suspensions together and obtain the intimate and uniform mixture by coflocculation, if necessary with the aid of a coagulating agent.

Whatever be the means employed to obtain this intimate and uniform mixture of reactive titanium compound and reactive lead compound, the mixture should be free from aggregates or coarse particles of either ingredient. The best results are obtained when employing starting mixtures having an average particle size of about 2-3 microns. In any case, particles substantially in excess of 5 microns are undesirable in the starting mixture.

Upon this feature of the present invention depends in a measure the completeness of the ultimate reaction and the time required to complete the said reaction, and to a lesser degree, the particle size of the final product.

If it be desired that the final product be substantially free from chalking then in preparing the intimate and uniform starting mixtures the proportions of lead and titanium compounds must be carefully controlled in order that the final product be substantially free from an excess of either starting ingredient. If there is present in the final product any considerable excess of titanium dioxide, the product will exhibit some tendency to chalk; if lead oxide be in excess the product will tend to react with oleaginous vehicles forming soaps which render the composition thick and gummy. It appears also that free PbO will tend to accelerate the breakdown of the titanate molecule. However, if products containing uncombined $TiO_2$ are prepared according to the present invention they will exhibit a reduced tendency to chalking as compared with pure titanium dioxide and the preparation of such products is within the scope of the present invention. Therefore, the proportion of reactive titanium compound to reactive lead compound in the starting mixture should be so regulated that there will be present at least one molecule of $TiO_2$ for every molecule of PbO. In the event that a substantially non-chalking pigment is desired the content of free $TiO_2$ in the final product should not substantially exceed about 2%, and the content of free PbO in all cases should not substantially exceed about 1%.

It will be understood that by the terms "reactive lead compound" and "reactive titanium compound" I mean to include the oxides of lead and titanium, including hydrous titanium oxide and titanium dioxide, as well as lead and titanium compounds which when heated to the calcination temperatures hereinafter disclosed yield the oxides of these metals.

II. *The adjustment of the content of sulfuric acid or its equivalent in the starting mixture*

I have observed that lead titanate is extremely sensitive to light: it changes color from a pure light yellow to an olive-gray tint when exposed to actinic rays. The elimination of this photosensitivity constituted a major problem in the preparation of lead titanate suitable for use as a pigment.

I have now found that if lead sulfate be formed, in situ, in the reaction mixture simultaneously with the formation of the lead titanate and in amounts hereinafter to be set forth the resultant product will be substantially free from photosensitivity.

In order that lead sulfate be formed, in situ, in the reaction mixture it is necessary that sulfuric acid or its equivalent as reactive sulfate radical and an additional equivalent quantity of reactive lead compound in excess of that required to form lead titanate be present in the reaction mixture prior to heating. The quantity of sulfuric acid and reactive lead compound should be so adjusted that the final product will contain lead sulfate in an amount between about 5% and 25%.

The manner of adjusting the sulfuric acid content of the reaction mixture will depend upon the nature of the reactive titanium compound employed as the source of titanium. For example, it is convenient to employ in the practice of my invention hydrous titanium oxide hydrolytically precipitated from sulfuric acid solutions of titanium. Even after thorough washing such hydrous titanium oxide always contains a certain amount of combined or adsorbed sulfuric acid. The amount of this combined or adsorbed sulfuric acid will vary depending upon the hydrolysis conditions, physical character of the hydrous titanium oxide and manner of washing. Generally speaking, the sulfuric acid content of precipitated hydrous titanium oxide tends to increase with increasing fineness of particle size. Therefore, when employing hydrous titanium oxide containing combined or adsorbed sulfuric acid in the practice of my invention it is first necessary to determine the quantity of sulfuric acid contained in the said hydrous titanium oxide and then to adjust as by elimination, in the well-known manner as by adding neutralizing agents which form neutral sulfates, or by addition of more sulfuric acid in order to obtain the desired quantity of lead sulfate in the final product.

I am aware that the prior art has suggested that a titanic acid containing the $SO_4$ radical could be used in reactions which yield titanates. However, the prior art has failed to disclose the relation between lead sulfate content and the pigment properties, particularly the photosensitivity of lead titanate. The prior art always regarded the presence of the sulfate radical as an undesirable impurity and made every effort to eliminate it prior to or during the thermal reaction. Thus, for example, in the preparation of lead titanate the prior art employed temperatures approaching 1000° C. in order to decompose any lead sulfate formed. Furthermore, as pointed out above, the sulfate radical or sulfuric acid content of titanic acid hydrolytically precipitated from titanium sulfate solutions will vary, and this fact, in my opinion, accounts for the great variation in photosensitivity observed in prior art lead titanate.

If hydrous titanium oxide from which the sulfuric acid has been removed, or if anhydrous titanium dioxide be employed in the practice of my invention as the source of titanium it will be understood that in practicing this feature of my invention it will be necessary to add sufficient sulfuric acid or its equivalent as reactive sulfate radical to yield the desired content of lead sulfate. Therefore, in a process for the preparation of a substantially non-chalking lead titanate pigment embodying all three features of my present invention the content and proportions of the essential ingredients of the starting mixture will be as follows:

A reactive titanium compound such as hydrous titanium oxide, anhydrous titanium dioxide, or other compound of titanium, which on heating to the temperatures employed in the practice of my invention yield the dioxide of titanium; a quantity of sulfuric acid or its equivalent sufficient, a part or all of which may be adsorbed by or combined with the hydrous titanium oxide, to yield lead sulfate in an amount between 5% and about 25% in the final product; a reactive lead compound, such as litharge, PbO, or a compound of lead capable of yielding PbO on heating to the temperatures employed in the practice of the invention in an amount substantially sufficient to supply one molecule of PbO for every molecule of $TiO_2$ present in the reaction mixture plus an additional quantity of reactive lead compound to supply one molecule of PbO for every molecule of $H_2SO_4$ present in the said reaction mixture. If desired, in order to insure that no free PbO will be present in the final product, a slightly less amount of reactive lead compound may be employed.

By the expression "sulfuric acid or its equivalent" as used in this description and the expression "sulfuric acid" as in the claims hereof, I mean to include not only sulfuric acid, but reactive sulfate compounds, for example, titanium sulfate, which yields reactive sulfate ions on heating to the temperatures employed in the reaction to form with the reactive lead compound, lead sulfate.

When this second feature of my invention is practiced in accord with the instructions hereinabove given, the product quite unexpectedly does not show any substantial diminution of tinting strength due to the presence of the lead sulfate. This is most surprising since mere mechanical mixtures of lead titanate and lead sulfate will show a tinting strength substantially that as would be expected from the proportions of the mixture and the tinting strength of lead titanate and lead sulfate respectively. For example, I have obtained average tinting strength values of about 600 with samples of properly milled substantially pure lead titanate $PbTiO_3$ prepared according to the present invention; whereas I have obtained a tinting strength value of 530 for a sample milled under similar conditions containing substantially 75% and 25% $PbSO_4$ prepared according to the methods of the present invention. Since normal lead sulfate milled under similar conditions possesses a tinting strength of only about 70, mechanical mixtures of 75% $PbTiO_3$ and 25% $PbSO_4$ would be expected to possess a tinting strength of only about 465. The average tinting strength for products of the present invention containing about 6 to 7% $PbSO_4$ is about 550, which shows a loss of only approximately 20 points for an increase in lead sulfate content of 17 to 18%. Furthermore, the presence of lead sulfate tends to produce a product of greater whiteness.

III. *The control of the calcination temperature*

I have found that it is necessary, in order that lead titanate possess the best pigment properties, to exercise careful control over the temperatures of the reaction between the reactive lead compound and the reactive titanium compound. Thus, I have found that the reaction temperatures should be so controlled that the lead titanate is substantially completely formed at a relatively low calcination temperature after which development of particle size and crystallinity is effected at a relatively high calcination temperature. The lower limit of the low calcination temperature at which titanate formation is effected is about 500° C. and the upper limit of the higher calcination temperature at which development of particle size and crystallinity is brought about is about 900° C. Preferably the first or low temperature calcination treatment is carried out at temperatures within the range of about 500° C. to a temperature below 750° C., and the second or higher calcination temperature is carried out at temperatures within the range of 750° C. to about 900° C.

Such control of reaction temperature may be obtained in several ways: for example, the starting mixture may be calcined in two steps wherein the starting mixture is first heated at temperatures within the lower range specified above for a period of time sufficient to combine the major portion of the starting ingredient in the form of lead titanate after which the temperature may be raised to within the higher range specified above, and held at that point until the product has developed the desired degree of crystallinity and particle size. On the other hand, the starting mixture may be heated through a gradually increasing temperature within the range of from about 500° C. to about 900° C. For this latter method for obtaining desired control of reaction temperature a rotary furnace is useful. The starting mixture may be fed into such furnace and the rate of travel of the reaction mixture so regulated by adjustment of the rotation speed and angle of inclination of the furnace that the said reaction mixture will remain in the lower temperature zone specified above from which the product will emerge after a period of time sufficient to develop the desired degree of crystallinity and the proper particle size. The period of time at which the reaction mixture is kept within the lower temperature zone may be determined by withdrawing samples from the calcination from time to time and determining the content of unreacted starting ingredients. Generally, it will not be necessary to keep the reaction mixture in the lower temperature zone until titanate formation is complete but only until a major portion of the reaction ingredients are combined in the form of titanates. The period of time in which the reaction mixture is kept within the higher temperature zone may be regulated according to the size of particle desired and the degree of crystallinity, for example, as the size of particle approaches $10^{-6}$ cm., i. e., one micron, the product will begin to show sharp X-ray diffraction lines. Thus, the growth of particle size may be followed by means of an X-ray examination. The increasing sharpness of diffraction lines denotes an increase in particle size. On the other hand, the particle size determination may be made by means of a microscope, whereby the size of a particle under a given magnification is compared with a scale related to that magnification. Coincident with increase of particle size the product tends to become more resistant to weather influences and to chalking. However, it will be understood that the particle size should not be increased to such a point that the product will be coarse. As shown by Figure No. 3 the lead titanates prepared according to the present invention will, in general, be free from more than a trace of particles in excess of 3 microns. In any event, lead titanate pigments prepared according to my invention should not contain particles in excess of 5 microns.

The present invention avoids the pitfalls of the prior art because it separates titanate formation, on the one hand, from development of particle size and crystallinity on the other hand. It will be appreciated that when heating at a single elevated temperature according to the prior art, titanate formation and development of crystallinity and growth of particle size are progressing simultaneously. Consequently, such prior art products lack the uniformity necessary for a proper pigment and no amount of milling will suffice to break down the large, hard particles formed. It will be understood, of course, that in stating that titanate formation is substantially completed at the lower temperature within the specified range herein given, I mean that the major portion of the lead has been combined with titanium. Any uncombined lead compound which remains after the heating at the lower temperature is promptly combined at the elevated temperature. Thus, the control of reactive temperature envisioned by me serves not only to produce a product of uniform particle size but one which, depending on the proportion of starting ingredients, is substantially free from unreacted starting ingredients.

There is a second advantage obtained from this feature of my present invention: when the temperature of calcination is elevated much above about 900° C. any lead sulfate which may be formed will tend to fuse thus causing sintering to take place with consequent formation of aggregated particles which further destroy the uniformity of the product and make it coarse. By controlling the reaction temperature in the manner herein described this sintering and resulting aggregation is avoided.

Having described my invention, the following examples are given for illustrative purposes only. It will be understood that no undue limitations are to be drawn therefrom.

EXAMPLE No. 1

*Preparation of substantially pure lead titanate—two-step calcination*

About 26.5 kilograms of anhydrous titanium dioxide containing about 99.5% $TiO_2$ and about 73.6 kilograms of fume litharge, being substantially 100% PbO were intimately mixed with a sufficient quantity of water to form a slurry. This slurry was then milled in a ball mill for about one hour to insure uniform and intimate mixing of the $TiO_2$ and PbO. The mixture was then dewatered and dried in a drying oven. After drying the mixture was calcined for about two hours at a temperature of about 600° C. during which the formation of lead titanate was substantially complete. The temperature was then raised to 825° for about three and one-half hours. After the second step the product was pulverized to render it useful as a pigment.

The product had the following characteristics:

Color_____ Clear light yellow.
Composition _____ $PbTiO_3$ (less than 1.0% free $TiO_2$ and less than 1.0% free PbO).
Tinting strength___ 610.
Oil absorption_____ 14.

This product was somewhat photosensitive although in all other respects it was excellently adapted for use as a pigment.

EXAMPLE No. 2

*Preparation of lead titanate pigment using hydrous titanium oxide containing $H_2SO_4$—two-step calcination*

About 88 kg. of a washed hydrous titanium oxide slurry obtained by hydrolytic precipitation from a titanium sulfate solution and containing about 30% $TiO_2$, about 8% $H_2SO_4$ and the remainder water was intimately and uniformly mixed by ball-milling for about one hour with about 74.0 kilograms of finely-divided litharge made up into a slurry with water. (This slight deficiency of PbO over that required theoretically to combine with all $H_2SO_4$ and $TiO_2$ insured the combination of all PbO and indicated the presence of a small amount of free $TiO_2$ in the final product.) The wet mixture was filtered and then dried. After drying, it was heated for about two hours at about 600° C. and then for about four hours at 800° C. After calcination the product was pulverized.

The lead titanate pigment thus obtained possessed the following characteristics:

Color_____ Clear yellow to white.
Composition:
  $PbTiO_3$_____ About 92.0%.
  $PbSO_4$_____ About 6.5%.
  $TiO_2$_____ About 1.5%.
  PbO_____ None.
Tinting strength_____ 570.
Oil absorption_____ 9.7.
Texture_____ Smooth.
Stable against photochemical changes.

By way of contrast and comparison with the product of this example and to demonstrate the effect of my novel calcination treatment, I prepared a lead titanate composition as follows:

EXAMPLE No. 2—A

Although there is no teaching in the prior art as to the manner of preparing the starting mixture and controlling the sulfuric acid content thereof, I took a starting mixture identical with that employed in the foregoing Example No. 2 and calcined it for about four and one-half hours at about 900° C. I selected this temperature, although prior art investigators generally employed higher temperatures, because it appears to be the lowest practical temperature at which crystalline lead titanate formation will be complete in a prior art calcination treatment. After calcination the product was pulverized under conditions identical with those employed in pulverizing the product of Example No. 2. It had the following characteristics:

Color_____ Olive-yellow.
Composition:
  $PbTiO_3$_____ About 92.0%.
  $PbSO_4$_____ About 3.0%.
  $TiO_2$_____ About 1.5%.
  PbO_____ About 2.2%.
Tinting strength_____ 140.
Oil absorption_____ 7.0
Texture_____ Hard and gritty.
Somewhat photosensitive.

It will be noted that although the same amount of sulfuric acid was present in the starting mixture here employed as was present in the starting mixture of Example No. 2, even at 900° C. sufficient sulfuric acid was lost, either by volatization or decomposition of $PbSO_4$ to reduce the lead sulfate content to 3.0% and to leave 2.2% free PbO.

The light reflectance properties of the products of Example Nos. 2 and 2—A are shown in Figure No. 1. In making these determinations it was found that the product of Example No. 2—A (on Fig. 1, designated as Pigment No. 2—A) was so coarse that it would not pack sufficiently to permit direct analysis. Therefore its reflectance properties were determined under glass which somewhat reduced its true reflectance. However, for the sake of comparison a similar determination of the light-reflectance properties of the product of Example No. 2 (on Fig. 1, designated as Pigment No. 2) was also made under the same glass. The light-reflectance properties of the Pigment No. 2 is given both as directly determined and as determined under glass. The curves, Fig. 1 and Table A, Fig. 1, strikingly show the superior brightness of the Pigment No. 2.

In order to show a comparison of the fineness and uniformity of the particles of the Pigment No. 2 and Pigment No. 2—A, photomicrographs of representative portions of both products magnified 1250 times were made. These are reproduced in Fig. 3. The uniformity and fineness of Pigment No. 2 as compared with the lack of uniformity and the presence of coarse particles in Pigment No. 2—A is evident. As shown by the scale in Fig. 2, Pigment No. 2 is free from particles in excess of 5 microns while Pigment No. 2—A contains a considerable amount of particles as large as about 8 microns.

EXAMPLE No. 3

*Lead titanate pigment—adjustment (elimination) of $H_2SO_4$—gradually increasing calcination temperature*

A quantity of washed hydrous titanium oxide containing about 26 kgms. of $TiO_2$ and about 2.1 kg. of $H_2SO_4$ was treated with sufficient aqueous ammonia to reduce the $H_2SO_4$ content to about 6.25% after which the ammonium sulfate formed was washed out. The hydrous titanium oxide containing the sulfuric acid was again slurried with water. Into this was gradually mixed about 72 kg. of finely-divided litharge and the whole milled for about one hour. The wet mixture was then filtered and dried. After drying, it was then fed to a rotary furnace, the speed and temperature of which was so regulated that the reaction mixture traveled through a zone of temperature between about 500° C. to below 750° C. in about two hours, and through a temperature zone of 750° C. to about 900° C. in about 4 hours. After this calcination treatment the product was pulverized for use as a pigment.

The lead titanate pigment thus obtained possessed the following characteristics:

Color_____ Clear yellow to white.
Composition:
    $PbTiO_3$_____ About 94.0%.
    $PbSO_4$_____ About 5%.
    $TiO_2$_____ About 1%.
    PbO_____ None.
Tinting strength_____ 570.
Oil absorption_____ 11.
Texture_____ Smooth.

Stable against photochemical changes.

EXAMPLE No. 4

*Preparation of starting mixture by precipitation method — adjustment (addition) of $H_2SO_4$ content*

About 20 kg. of anhydrous titanium dioxide was uniformly and evenly suspended in a solution of lead acetate containing an amount of lead, as PbO, equivalent to 75 kg. by continued and thorough agitation. When the $TiO_2$ was uniformly distributed in the lead acetate solution a sufficient quantity of concentrated aqueous solution of sodium carbonate was added thereto to precipitate an amount of lead carbonate equivalent to about 73 kgs. of PbO. The precipitated, uniform and intimate mixture of lead carbonate and $TiO_2$ was then washed free of mother liquor. There is present an excess of lead necessary to combine with sulfuric acid which was then added in an amount sufficient to yield lead sulfate to the extent of 25% in the final product. This mixture was then calcined for about 1¾ hours at 650° C., after which the temperature was raised to 800° C. and maintained there for 4 hours. After calcination the product was pulverized. The lead titanate composition thus obtained had the following characteristics:

Color_____ Yellowish-white.
Composition:
    $PbTiO_3$_____ About 74%.
    $PbSO_4$_____ About 25%.
    Free $TiO_2$_____ Less than 1%.
    PbO_____ None.
Tinting strength_____ 530.
Oil absorption_____ 15.
Texture_____ Smooth.

Stable against photochemical changes.

Throughout this description of my invention wherever tinting strength values are given they have been determined according to the so-called "Reynolds method", which is described on pages 92–93 of "Physical and Chemical Examination of Paints, Varnishes, Lacquers and Colors", by H. A. Gardner, 8th ed., published by the Institute of Paint and Varnish Research. Wherever the light-reflectance data is given such data was obtained by means of the Hardy spectrophotometer described on pages 135–137 of the Physical and Chemical Examination of Paints, Varnishes, Lacquers and Colors, supra as developed by Professor T. C. Hardy, author of "Handbook of Colorimetry", published by the Massachusetts Institute of Technology, 1936. In the curves, Fig. 1, and Table A, Fig. 1, the light-reflectance data is expressed according to the Hardy system.

Lead titanate pigment when prepared according to the present invention is an extremely useful material. When incorporated into surface coating vehicles it produces extremely durable and weather resistant protective films. In fact, it can be used for any purpose where a high grade pigment material is required, e. g., in synthetic plastics, artificial fibers, paper, rubber, etc.

Although I have described the process of my invention as relating to the preparation of lead titanate pigments consisting essentially of lead titanate and lead sulfate, the process of my invention is adapted to the preparation of composite lead titanate pigments in which there is present in addition to lead titanate and lead sulfate one or more inert pigment-forming materials such as the extenders, barium sulfate, calcium sulfate, etc. For example, the extender may be added to the starting mixture prior to calcination and the process of my invention then carried out as herein described. Or, on the other hand, if it be desired to adjust the sulfuric acid content of the reaction mixture by partially eliminating combined or adsorbed sulfuric acid from hydrous titanium oxide the alkali neutralizing agent employed may be one which, with sulfuric acid forms the extender such as, the oxides, hydroxides, carbonates and the like of the alkaline earth metals. Furthermore, as pointed out above, the process of my invention is applicable to the preparation of pigments which contain substantial quantities of uncombined titanium dioxide. For instance, when starting mixtures containing excess amounts of reactive titanium compound are calcined according to my invention to yield products comprising even as little as 5% lead titanates such products, compared to pure titanium dioxide, will exhibit a reduced tendency to chalk. They will, however, chalk somewhat more than the other products prepared according to my invention which consist essentially of lead titanate, or of lead titanate and lead sulfate.

The aforegoing description has been given for clearness of understanding and no undue limitations should be deduced therefrom, but the appended claims should be construed as broadly as possible in view of the prior art.

I claim:

1. Process for the preparation of a pigment which comprises mixing until a uniform and intimate, very finely-divided mixture is obtained, pigment-forming materials containing a "reactive lead compound" and a "reactive titanium compound", the amount of said "reactive lead compound" being not more than one mol PbO for every mol TiO₂, then heating said mixture at a temperature sufficient to form lead titanate but not sufficient appreciably to develop crystalline properties until formation of lead titanate is substantially complete and thereafter heating at a higher temperature to develop crystalline properties.

2. Process for the preparation of a pigment comprising lead titanate which comprises mixing until a uniform and intimate, very finely-divided mixture is obtained, a "reactive lead compound" and a "reactive titanium compound", the amount of said "reactive lead compound" being not more than one mol PbO for every mol TiO₂, heating the said mixture first at temperatures between about 500° C. and below 750° C. to form lead titanate, then heating at temperatures between 750° C. and about 900° C. to obtain a product of uniform particle size free from more than a trace of particles in excess of 5 microns.

3. Process for the preparation of a pigment comprising lead titanate which comprises mixing until a uniform and intimate, very finely-divided mixture is obtained, a "reactive lead compound", water, a "reactive titanium compound" and sulfuric acid, the amount of said "reactive lead compound" being not more than one mol PbO for every mol TiO₂ and H₂SO₄ and the amount of sulfuric acid being such that the product obtained on heat-treating the said mixture will contain between about 5% and about 25% of lead sulfate by weight driving the mixture so obtained and heating the said mixture first at temperatures between about 500° C. and below 750° C. to form lead titanate and lead sulfate, then heating at temperatures between 750° C. and about 900° C. to obtain a product of uniform particle size free from more than a trace of particles in excess of 5 microns.

4. Process for the preparation of a pigment comprising lead titanate which comprises mixing until a uniform and intimate, very finely divided mixture is obtained, a "reactive lead compound", water, a "reactive titanium compound" and sulfuric acid, the amount of said "reactive lead compound" being not more than one mol PbO for every mol. TiO₂ and H₂SO₄ and the amount of sulfuric acid being such that the product obtained by heat-treating the said mixture will contain between about 5% and about 25% of lead sulfate based on the weight of lead titanate present in the said product, drying the mixture so obtained and heating said mixture first at temperatures between about 500° C. and below 750° C. to form lead titanate and lead sulfate, then heating at temperatures between 750° C. and about 900° C. to obtain a product of uniform particle size free from more than a trace of particles in excess of 5 microns.

5. Process for the preparation of a pigment comprising lead titanate which comprises mixing until a uniform and intimate mixture substantially free from particles in excess of 5 microns is obtained, litharge, water, hydrous titanium oxide and sulfuric acid, the amount of litharge being not more than 1 mol PbO for every mol of TiO₂ and H₂SO₄ and the amount of sulfuric acid being such that the product obtained on heat-treating the said mixture will contact between about 5% and about 25% of lead sulfate by weight, drying the mixture so obtained and heating the said mixture first at temperatures between about 500° C. and below 750° C. to form lead titanate and lead sulfate, then heating at temperatures between 750° C. and about 900° C. to obtain a product of uniform particle size free from more than a trace of particles in excess of 5 microns.

6. In a process of preparing a pigment comprising lead titanate, the steps which consist in heating an intimate, very finely-divided and uniform mixture of a "reactive lead compound" and "reactive titanium compound" first at temperatures between about 500° C. and about 750° C. to form lead titanate, then heating at temperatures between 750° C. and about 900° C. to obtain a product of uniform particle size free from more than a trace of particles in excess of 5 microns.

7. In a process of preparing a pigment comprising lead titanate, the steps which consist in heating an intimate, very finely-divided and uniform mixture of a "reactive lead compound" and "reactive titanium compound", containing not more than 1 mol PbO for every mol TiO₂ first at temperatures between about 500° C. and about 750° C. to form lead titanate, then heating at temperatures between 750° C. and about 900° C. to obtain a product of uniform particle size free from more than a trace of particles in excess of 5 microns.

8. In a process of preparing a pigment comprising lead titanate, the steps which consists in heating an intimate, very finely-divided and uniform mixture of a "reactive lead compound", water, a "reactive titanium compound" and sulfuric acid, containing not more than one mol PbO for every mol of TiO₂ and H₂SO₄ and an amount of sulfuric acid such that the product obtained on heat-treating the said mixture will contain about 5% and about 25% of lead sulfate by weight, first at temperatures between about 500° C. and about 750° C. to form lead titanate, then heating at temperatures between 750° C. and about 900° C. to obtain a product of uniform particles size free from more than a trace of particles in excess of 5 microns.

9. In a process of preparing a pigment comprising lead titanate, the steps which consist in heating an intimate, very finely-divided and uniform mixture of a "reactive lead compound", water, a "reactive titanium compound" and sulfuric acid containing not more than one mol PbO for every mol TiO₂ and H₂SO₄ and an amount of sulfuric acid such that the product obtained on heat-treating the said mixture will contain about between 5% and about 25% of lead sulfate based on the weight of lead titanate present in the said product, first at temperatures between about 500° C. and about 750° C. to form lead titanate, then heating at temperatures between 750° C. and about 900° C. to obtain a product of uniform particle size free from more than a trace of particles in excess of 5 microns.

10. In a process of preparing a pigment comprising lead titanate, the steps which consist in heating an intimate and uniform mixture substantially free from particles in excess of 5 microns of litharge, water, hydrous titanium oxide and sulfuric acid containing not more than one mol PbO for every mol $TiO_2$ and $H_2SO_4$ and an amount of sulfuric acid such that the product obtained on heat-treating the said mixture will contain about between 5% and about 25% of lead sulfate based on the weight of lead titanate present in the said product, first at temperatures between about 500° C. and about 750° C. to form lead titanate, then heating at temperatures between 750° C. and about 900° C. to obtain a product of uniform particle size free from more than a trace of particles in excess of 5 microns.

11. As a new composition of matter, a pigment substantially identical with a product obtained according to the process of claim 1, said pigment consisting of substantially pure lead titanate of uniform particle size, being free from more than a trace of particles in excess of 5 microns, having a high brightness, a clear light yellow color, and a tinting strength of about 600 as determined by the Reynolds method.

12. As a new composition of matter, a pigment substantially identical with a product obtained according to the process of claim 1, said pigment consisting of substantially pure lead titanate and titanium dioxide of uniform particle size, being free from more than a trace of particles in excess of 5 microns, having a high brightness, a clear light yellow to white color and a tinting strength of at least 600 as determined by the Reynolds method.

13. As a new composition of matter, a pigment substantially identical with a product obtained according to the process of claim 3, said pigment consisting essentially of lead titanate and lead sulfate, the amount of lead sulfate being between about 5% and about 25% by weight containing an amount of lead compounds other than the titanate and sulfate not substantially greater than 1% and an amount of titanium dioxide not substantially more than 2%, substantially uniform in particle size and containing not more than a trace of particles in excess of 5 microns, substantially free from photosensitivity and adapted to form when incorporated into film-forming vehicles substantially non-chalking surface-coating compositions.

14. As a new composition of matter, a pigment substantially identical with a product obtained according to the process of claim 3, said pigment consisting essentially of lead titanate, lead sulfate and titanium dioxide, the amount of lead sulfate being between about 5% and 25% by weight containing an amount of lead compounds other than the titanate and sulfate not substantially greater than 1%, substantially uniform in particle size and containing not more than a trace of particles in excess of 5 microns, substantially free from photosensitivity and adapted to form when incorporated into film-forming vehicles substantially non-chalking, surface-coating compositions.

15. As a new composition of matter, a pigment substantially identical with a product obtained according to the process of claim 4, said pigment consisting essentially of lead titanate, lead sulfate and titanium dioxide, the amount of lead sulfate being between about 5% and about 25% by weight based on the content of lead titanate containing an amount of lead compounds other than the titanate and sulfate not substantially greater than 1%, substantially uniform in particle size and containing not more than a trace of particles in excess of 5 microns, substantially free from potosensitivity and adapted to form when incorporated into film-forming vehicles substantially non-chalking surface-coating compositions.

HELMUT ESPENSCHIED.